F. SMITH.
SHOCK PREVENTER.
APPLICATION FILED FEB. 29, 1916.

1,196,167.

Patented Aug. 29, 1916.
2 SHEETS—SHEET 1.

Inventor
Fred Smith
By his Attorney

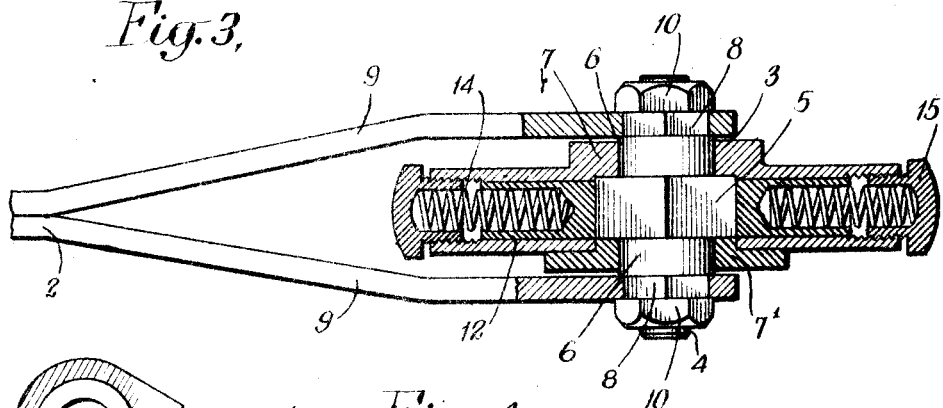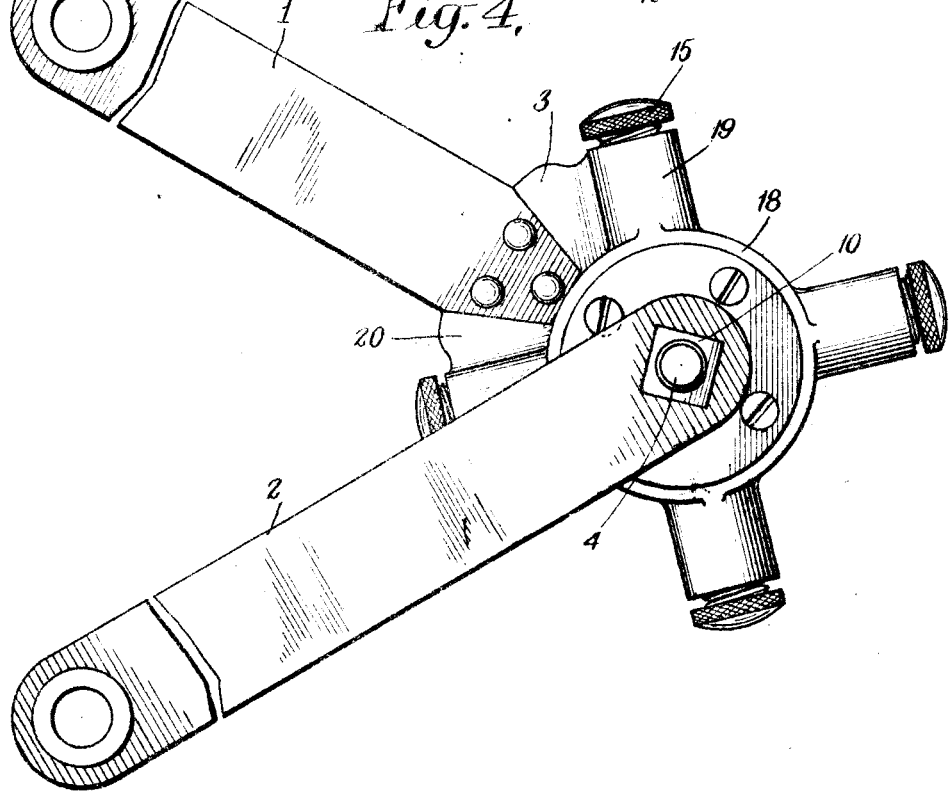

UNITED STATES PATENT OFFICE.

FRED SMITH, OF SPRINGDALE, CONNECTICUT.

SHOCK-PREVENTER.

1,196,167.  Specification of Letters Patent.  Patented Aug. 29, 1916.

Application filed February 29, 1916. Serial No. 81,091.

*To all whom it may concern:*

Be it known that I, FRED SMITH, a citizen of the United States, residing at Springdale, in the county of Fairfield and State of Connecticut, have invented certain new and useful Improvements in Shock-Preventers, of which the following is a specification.

My invention relates to shock preventing and absorbing devices for automobiles and other purposes.

My invention comprises improved devices, whereby movement of one part away from its normal relation to another part is freely permitted while return of the moved part to normal is retarded. Thus in the case of an automobile, the wheels may freely descend into a hole, or rise over a bump while the mechanism of my shock preventer acts to hold the body substantially in the same plane in which it was moving before the wheels moved away from the plane of their normal relation to the body. According to my present invention, these objects are effected by means of a pair of arms adapted to be connected respectively to the body and chassis or axles of a vehicle, the arms being pivotally connected and normally maintained at a desired angle. An angular member is secured to one of the arms, and a plurality of movable members coact therewith, these members being slidably mounted or guided in a frame secured to the other arm. These movable members are spring-pressed into contact with the angular member and have tapered or wedge-shaped inner ends which normally engage the angular member at or adjacent to its angles. The result of this construction is that movement of the wheels toward or away from the body is freely permitted and is even accelerated, as the wheels travel over the inequalities of the road, while a pressure tending to maintain the body in its former position is exerted by the pressure of the movable members against the sides of the angular member, return of the wheels and body to their normal relative position requiring the outward camming of the movable members by the angular member against the spring pressure of the movable members.

In order that a clearer understanding of my invention may be had attention is hereby directed to the accompanying drawings forming part of this application and illustrating certain embodiments thereof.

Figure 1:
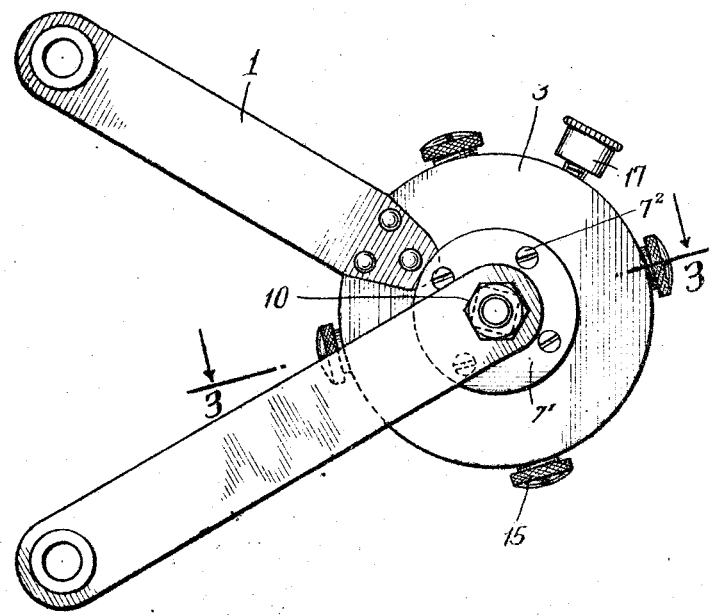
Figure 2:
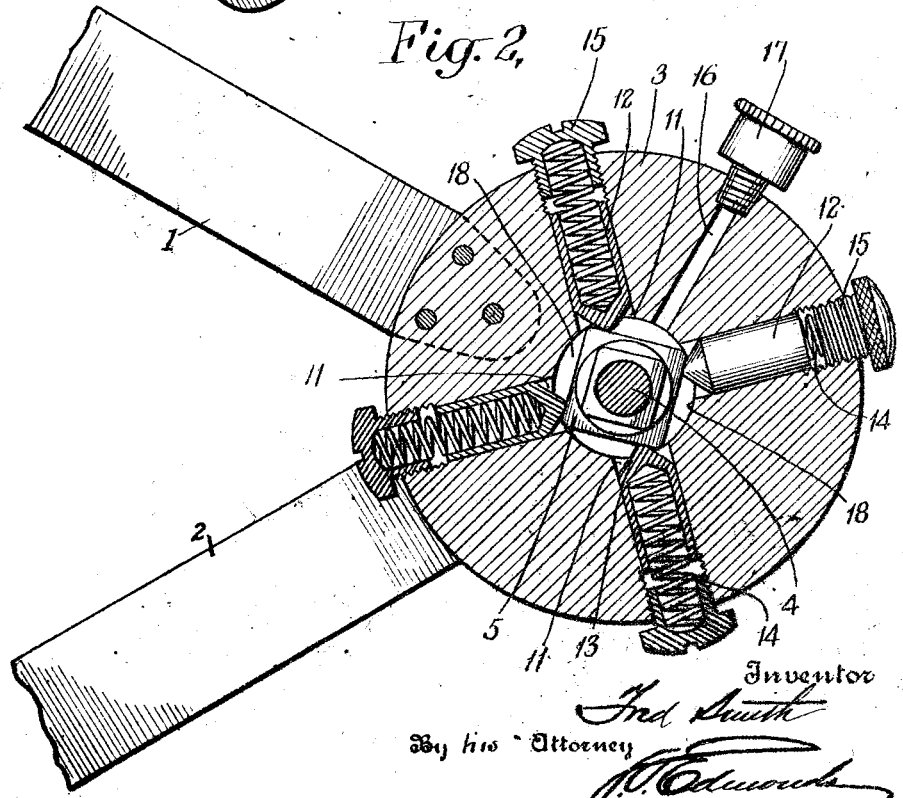

In the drawings, Figure 1 represents a side view of a shock preventer embodying my invention, Fig. 2 is an enlarged vertical central section through the same, the arms being shown in side elevation, Fig. 3 is a horizontal section taken on line 3—3 of Fig. 1, to an enlarged scale, and Fig. 4 is a view similar to Fig. 1, showing a modification of my invention.

Referring to the drawings, the arms 1 and 2 may be suitably connected to the body and chassis of an automobile or the like, in which in common practice a leaf-spring (not shown) is interposed between the body and wheels, which normally holds the same at approximately a constant distance apart. When, however, the wheels abruptly rise or fall in following the inequalities of the road, the spring is extended, the momentum of the body tending to maintain it momentarily at its former level. The devices to be described hereafter exert a resilient force against the tendency of the body to follow the movements of the wheels away from normal by presenting a combined inclined plane and spring pressure against the tendency of the body to follow the movements of the wheels.

In the form of my invention illustrated in Figs. 1 to 3, the arm 1 is suitably secured to a disk-shaped body 3, through which extends, at the axis thereof, the stub-shaft 4. Stub-shaft 4 is provided intermediate its length with an angular portion, preferably square or hexagonal, 5. Cylindrical portions 6, 6 are provided on both sides of angular portion 5, the body 3 having portions 7, 7' in which the cylindrical portions 6, 6 of the stub-shaft are journaled. Portion 7' preferably constitutes a separate flanged cylindrical bearing member secured to body 3 by screws 7², as shown. Square or other angular portions 8, 8 are formed on the stub-shaft outside the cylindrical portions, the arm 2 being secured to these angular portions 8. Arm 2 may be formed with two diverging portions 9, 9, which extend on either side of disk 3, and are provided with squared or angular openings which are fitted about the angular portions 8 of the stub-shaft, the latter being provided with screw-threaded ends on which nuts 10 are tightened outside the arms 9, 9, to firmly bind the latter to the stub-shaft.

The disk 3 is provided with central radial passages 11 in which are mounted the movable members 12. The latter are provided with tapered or wedge-shaped inner ends 13 which are adapted to contact the surfaces of the angular portion 5 of the stub-shaft. Members 12 are spring-pressed into contact with the angular portion 5, members 12 preferably being provided with axial recesses in which springs 14 are mounted. Abutments for the outer ends of the springs are provided, these preferably comprising screw plugs 15 threaded into the outer ends of the radial openings 11 and provided with axial openings in which the outer ends of the springs are received. The tension of the springs may be adjusted by screwing plugs 15 more or less into their respective openings. An oil passage 16 for the journal-bearings may be provided, covered by a screw cap 17. A cylindrical space 18 is provided in disk 3 about the angular portion 5 of the stub-shaft, to permit the rotation of the latter relative to disk 3.

When the device is mounted in position and the arms 1 and 2 pivotally connected to the body and wheels of a vehicle, the parts are so adjusted that the rounded apices of the inner ends of movable members 12 engage the apices or angles of angular portion 5 of the stub-shaft. When the wheels descend into a rut, the arm 2 moves downwardly away from arm 1, turning the angular portion 5 of the stub-shaft in a counter-clockwise direction, referring to Fig. 2, so that the wedge-shaped ends of members 12 slide down the sides of portion 5 into the positions shown in Fig. 2. This movement is accelerated by the pressure of springs 14, the inner ends of members 12 exerting a camming action against the faces of portion 5 of the stub-shaft, to accelerate its movement relative to disk 3 and arm 1. When the movement of arm 2 away from its normal position has been made, however, the engagement of the tapered ends of members 12 with the faces of portion 5 of the stub-shaft tends to hold arm 1 and the body of the vehicle in its former position, and permits arm 1 to follow arm 2 only slowly, if the wheels remain on the lower level to which they have descended. In the return of the parts to their normal angular relation from the position shown in Fig. 2, members 12 must be cammed outwardly, against the pressure of their springs, by the movement of angular portion 5 of the stub-shaft in a clockwise direction. Similarly, when the wheels ascend a bump in the road, angular portion 5 of the stub-shaft moves in a clockwise direction with the tapered inner ends of members 12 engaging the faces of portion 5 on the opposite sides of the angles from those shown as engaged in Fig. 2, the action in this case also being to aid the movement of the wheels away from normal and to tend to prevent an abrupt rise of the body following the rise of the wheels.

The construction shown in Fig. 4 is similar to that illustrated in Figs. 1 to 3, and differs only in that the body 3 is given a spider formation, the central cylindrical portion 18 having cylindrical arms 19 extending therefrom through which extend radial openings 11 with movable members 12 and screw plugs 15, the same as in the form of my device previously described. In this case member 3 is provided with a web portion 20 between a pair of arms 19, to which the arm 1 is secured.

It should be understood that my invention is not strictly limited to the exact form of construction described, but is as broad as is indicated by the accompanying claims.

Having now described my invention, what I claim as new therein and desire to secure by Letters Patent is as follows:—

1. In a shock preventer, the combination of a pair of arms, a body to which one arm is secured, a stub-shaft extending through the body and journaled therein, the second arm being secured to said stub-shaft, said stub-shaft having an angular portion, and spring-pressed members mounted radially in said body with tapered inner ends contacting surfaces of said angular portion, said members being adapted to normally contact said angular portion approximately at the angles thereof, when said shock preventer is in operation, substantially as set forth.

2. In a shock preventer, the combination of a pair of arms, pivotally connected at their inner ends, an angular member axially arranged with respect to said arms, secured to one of the same, abutments and guiding means secured to the other arm, movable members in said guiding means contacting said angular member, and spring means engaging said abutments and pressing said members into contact with said angular member, said members being adapted normally to contact said angular member approximately at the angles thereof, substantially as set forth.

3. In a shock preventer, the combination of a pair of arms, pivotally connected at their inner ends, a member having wedge surfaces secured to one of said arms to oscillate therewith, movable members having wedge-shaped ends contacting said first member adjacent the high points thereof, guiding means for said last named members carried by the other of said arms, spring means pressing said last-named members into contact with said first member, said arms being adapted to be secured to the body and wheels of a vehicle, substantially as set forth.

4. In a shock preventer, the combination of a pair of arms, adapted to be connected to parts having a normal relation and relative motion in opposite directions from the same, a pivotal connection between the arms, a member secured to one of the arms having a plurality of angles connecting its exterior surfaces, guiding means carried by the other of said arms, and a plurality of members having tapered ends in said guiding means, independently spring-pressed into contact with said first member, said members being arranged to retard return of said arms to normal relation after relative movement therefrom in either direction, substantially as set forth.

5. In a shock preventer, the combination of a pair of arms, a body to which one arm is secured, a stub-shaft extending through the body and having cylindrical portions on which the body is journaled, and an angular portion, the second arm having portions secured to said shaft on both sides of the body, said body having guides and abutments, movable members in said guides contacting said angular portion of the stub-shaft, one adjacent to each angle of the angular portion, and springs between said abutments and members for pressing said members into contact with said angular portion, substantially as set forth.

6. In a shock preventer, the combination of a shaft having an angular portion, an arm journaled on said shaft, a second arm secured to said shaft, and extending at an angle to the first arm, a radially movable member having a wedge-shaped inner end adapted to contact the surfaces of the angular portion of the shaft on both sides of an angle thereon, carried by the first arm, and resilient means holding said movable member in contact with said angular portion, substantially as set forth.

This specification signed and witnessed this 26th day of February, 1916.

FRED SMITH.

Witnesses:
BERTHA B. LORD,
F. H. GREEN.